United States Patent [19]

Morgan et al.

[11] 4,171,625
[45] Oct. 23, 1979

[54] CRYOGENIC FREEZING TUNNEL

[75] Inventors: Michael W. Morgan, Palos Park, Ill.;
James E. Johnson, Southfield, Mich.;
Glenn A. Sandberg, Lockport, Ill.

[73] Assignee: Formax, Inc., Mokena, Ill.

[21] Appl. No.: 847,721

[22] Filed: Nov. 2, 1977

[51] Int. Cl.[2] ..................... F25D 25/04; F25D 17/02
[52] U.S. Cl. ........................................ 62/380; 62/55;
62/216; 62/374; 99/517
[58] Field of Search ................. 62/303, 374, 380, 375,
62/378; 198/860, 861; 99/517

[56] References Cited

U.S. PATENT DOCUMENTS

| | | | |
|---|---|---|---|
| 3,238,736 | 3/1966 | Macintosh | 62/380 X |
| 3,258,935 | 7/1966 | Ross | 62/380 X |
| 3,403,527 | 10/1968 | Berreth et al. | 62/380 X |
| 3,472,570 | 10/1969 | Moran | 62/374 X |
| 3,494,140 | 2/1970 | Harper et al. | 62/303 X |
| 3,580,000 | 5/1971 | Wagner | 62/380 X |
| 3,583,171 | 6/1971 | Flynn et al. | 62/303 X |
| 3,757,533 | 9/1973 | Kent | 62/374 X |
| 3,813,895 | 6/1974 | Klee et al. | 62/374 X |
| 3,892,104 | 7/1975 | Klee et al. | 62/380 X |
| 4,086,783 | 5/1978 | Wagner et al. | 62/374 |

*Primary Examiner*—Leslie Braun
*Attorney, Agent, or Firm*—Kinzer, Plyer, Dorn & McEachran

[57] ABSTRACT

A cryogenic food product freezing tunnel comprising a stationary structure including an entrance end housing section, a tunnel housing cover, and an exit end housing section, a conveyor to transport food products through the tunnel housing, a spray header to spray a liquid cryogen onto the food products near the exit end of the tunnel, and an exhaust plenum to exhaust cryogen gas from the entrance end. The base of the tunnel housing is a series of U-shaped modular units arranged end-to-end and suspended from the stationary structure by individual hydraulic elevators, movable between a lowered, open service position and a raised position sealed against the housing cover and the end housing sections. Each end base unit is lowered outwardly and downwardly to its service position and is raised along the same path; the base units are lowered in predetermined sequence, end units before center units, and are raised in the reverse sequence. The base units are held sealed to the stationary structure by constant pressure applied by the elevators, using double-bulb silicone gaskets with bonded polyfluoroethylene coverings. Each base unit includes plural sub-modules joined by shielded external expansion slip joints with a continuous interior sheet metal covering. The cover is of modular construction with polyfluoroethylene coated silicone gaskets of clothes-pin configuration between modules. The spray header is a large tube with liquid discharge nozzles below and gas relief nozzles above; excess liquid cryogen is collected in a very long pan below the header and the upper run of the conveyor belt is guided down and up very mild inclines to skim the surface of liquid cryogen in the pan. Insulated doors on the ends of the tunnel and an automatically controlled exhaust damper permits standby for extended periods. The conveyor belt supports are also of sub-modular construction.

14 Claims, 21 Drawing Figures

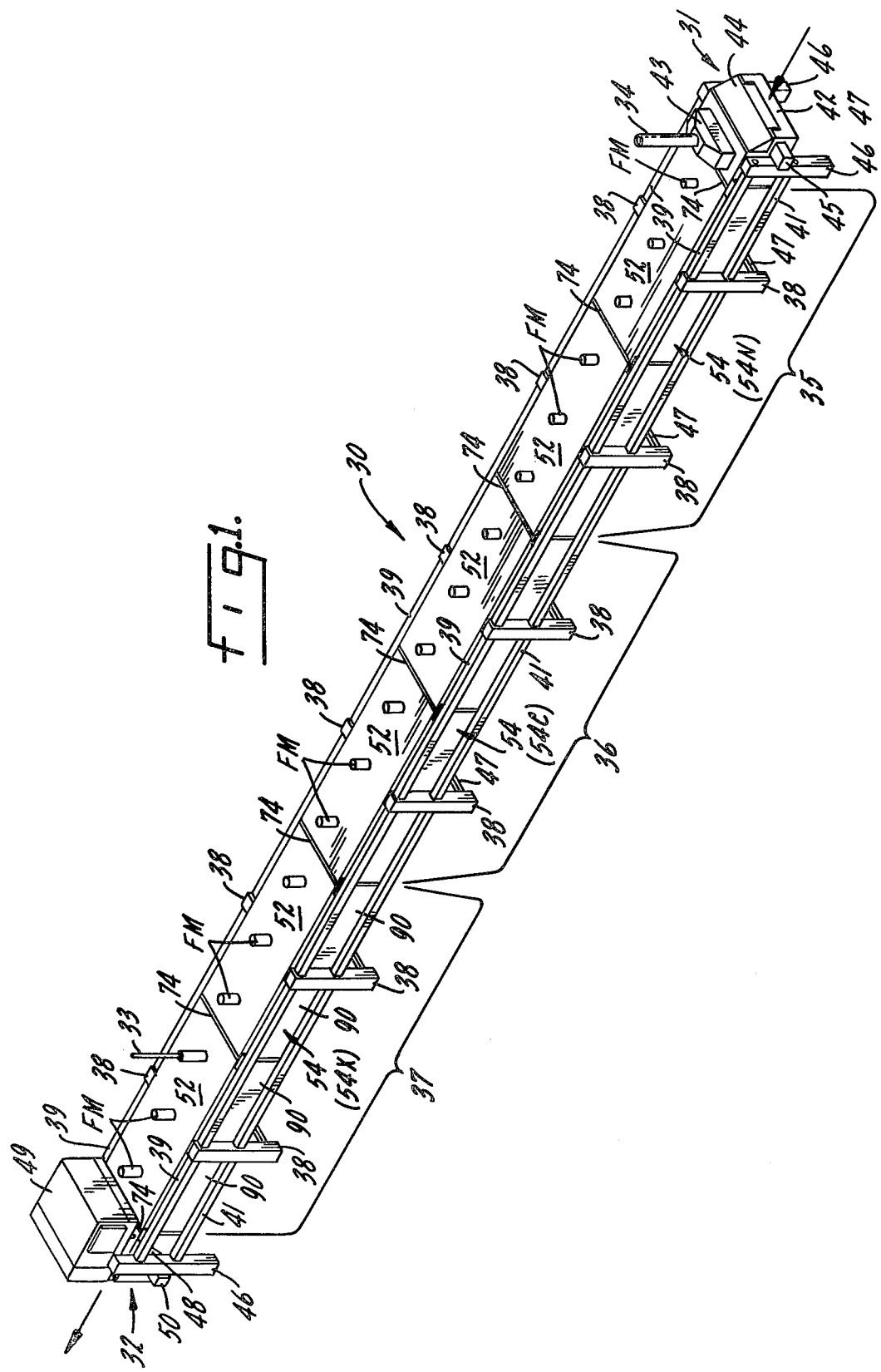

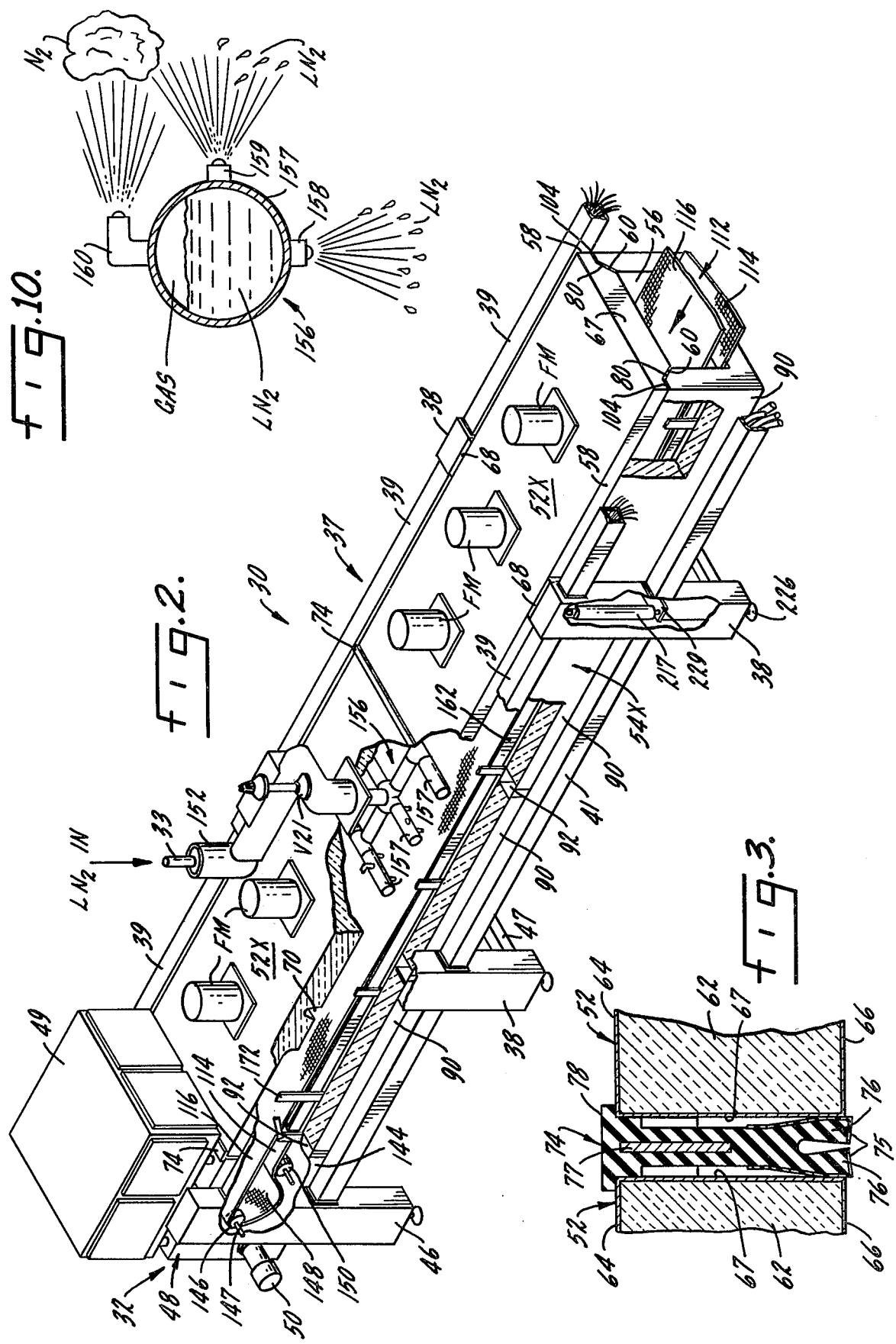

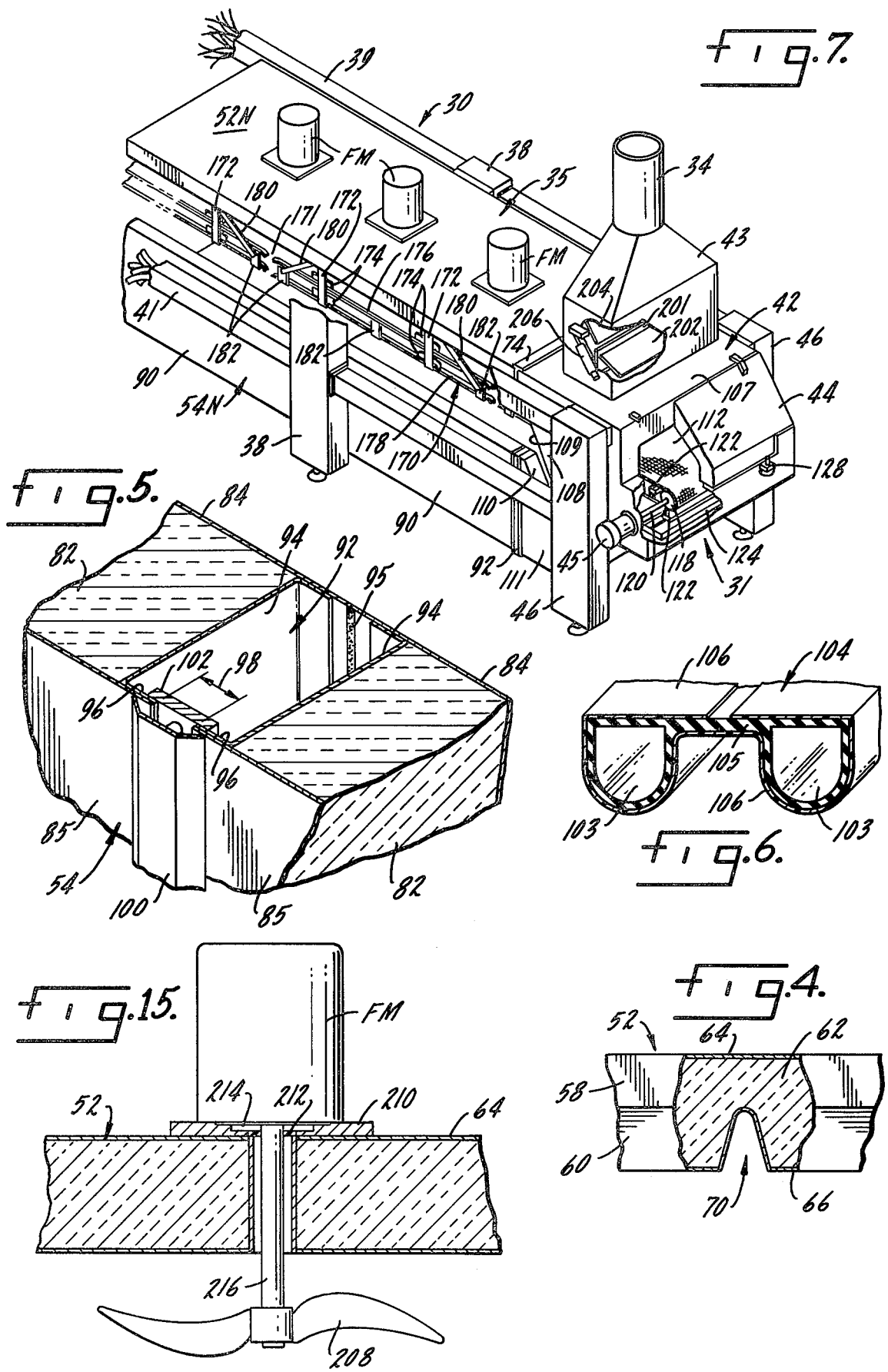

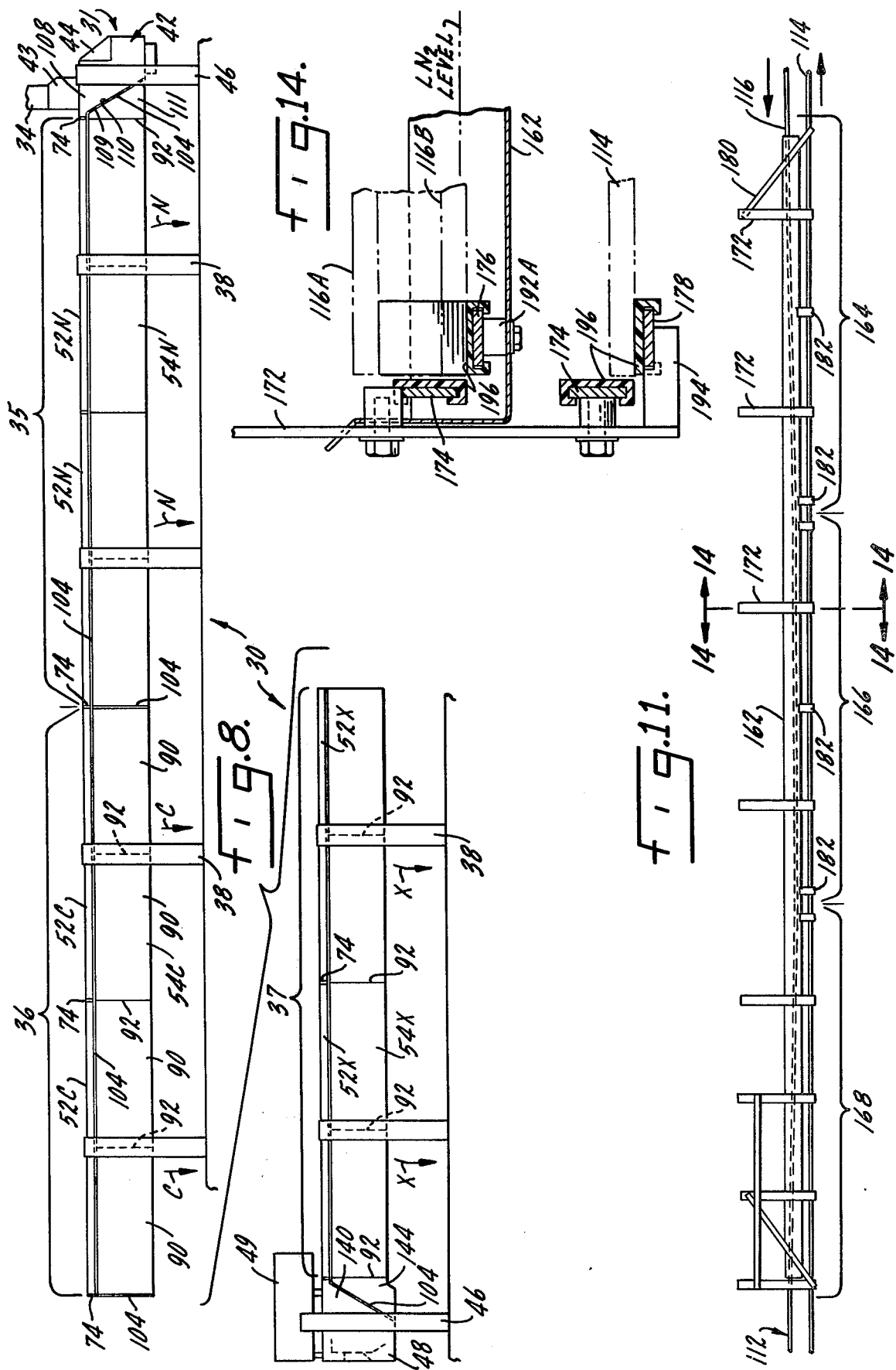

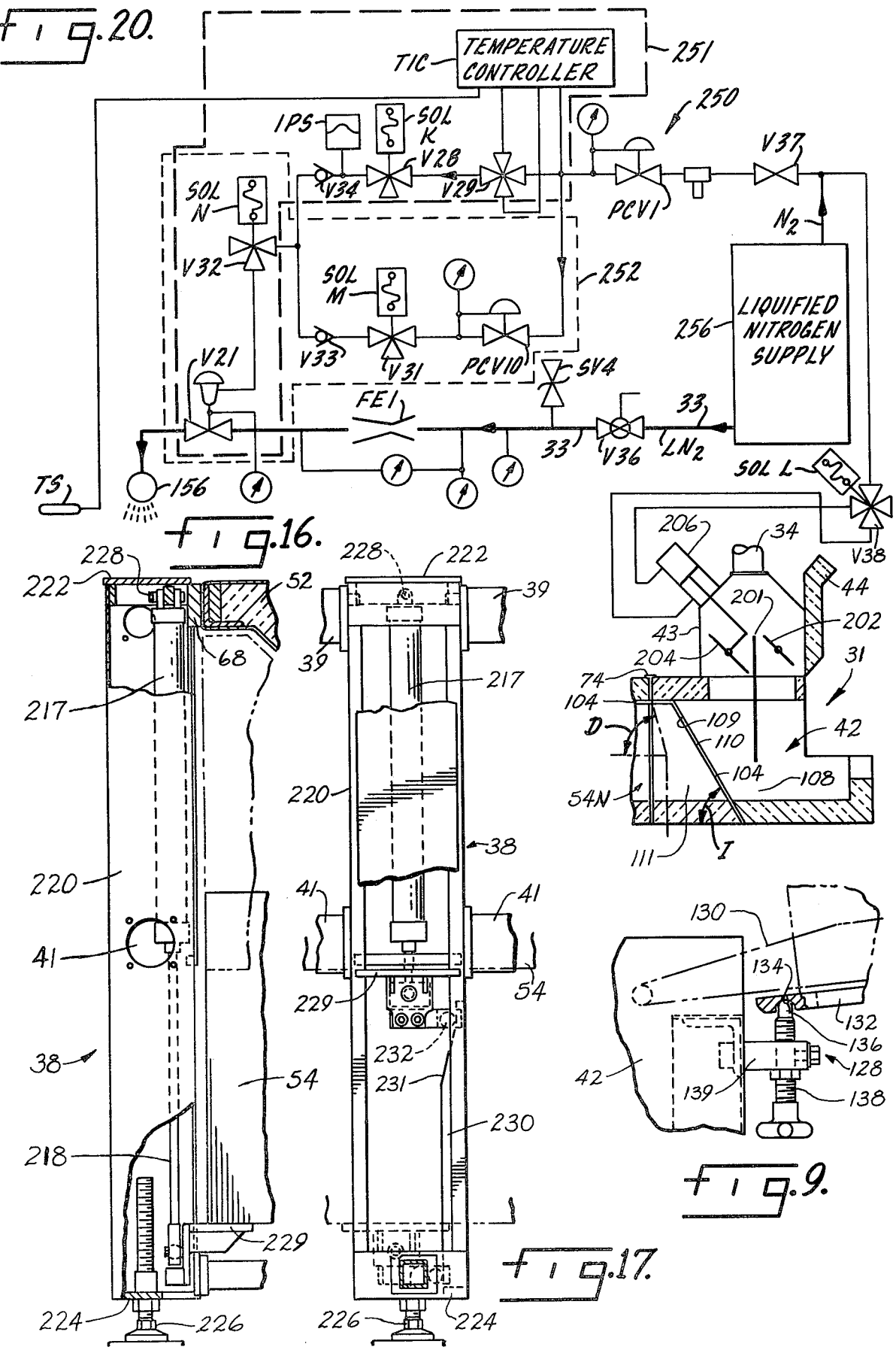

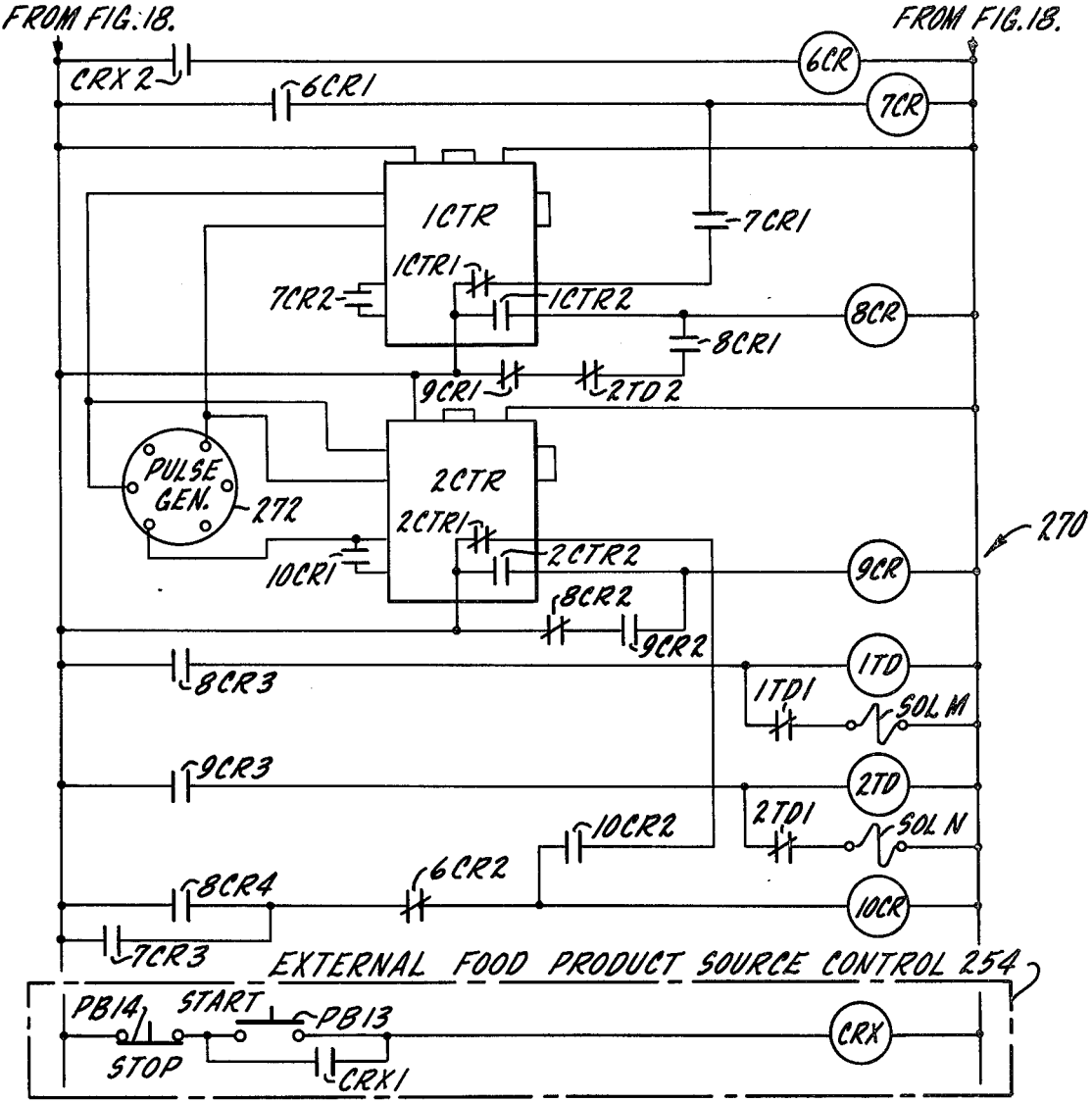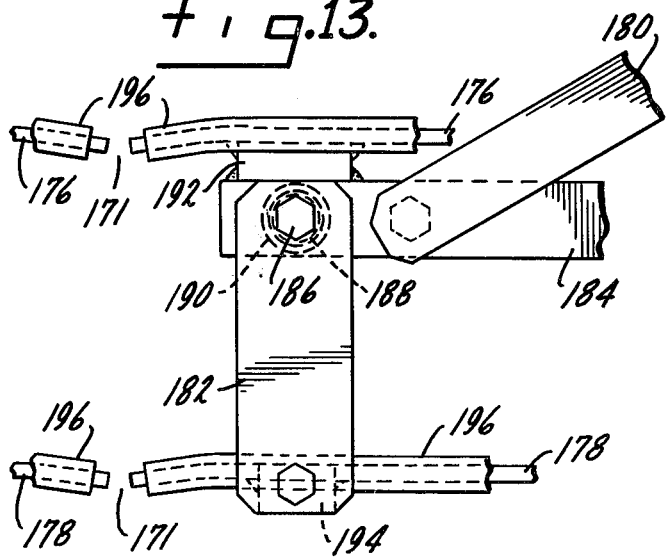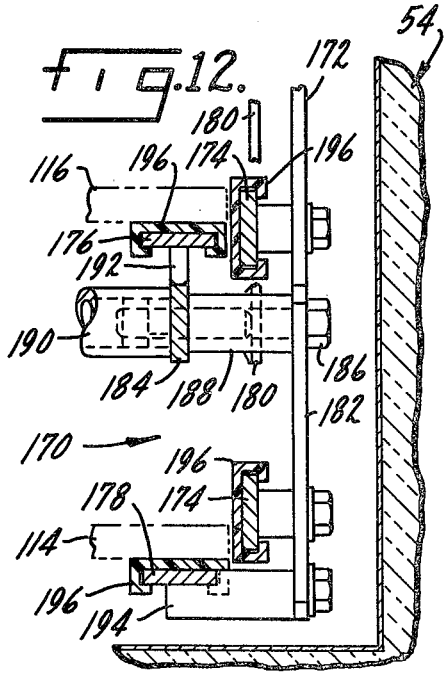

CRYOGENIC FREEZING TUNNEL

BACKGROUND OF THE INVENTION

A practical and advantageous construction for a cryogenic food product freezing tunnel is disclosed in Kent U.S. Pat. No. 3,757,533, Sept. 11, 1973. In that freezing tunnel, the tunnel conveyor, circulating fans, cryogen spray header, and cryogen gas exhaust plenum are all mounted on a stationary structure with the cover of the tunnel. The base of the tunnel housing is of U-shaped construction and is mounted on a series of elevators so that the base can be lowered from the tunnel cover to a service position, affording free service access to the tunnel conveyor and other mechanisms.

A freezing tunnel having an elevator-mounted base presents substantial and difficult technical problems if the tunnel is built up from modular units, a type of construction that is usually preferable due to the length of the tunnel, which is often sixty to eighty feet or more. Thus, with an elevator-mounted tunnel housing base comprising two or more modular base units, it is difficult to maintain an adequate seal at the interfaces between the base and the tunnel cover and between the base units if conventional mechanical latching arrangements are employed; a secure high-pressure seal achieved when the tunnel is first closed and is still warm may deteriorate markedly as the tunnel reaches its extremely low operating temperature, down to about $-320°$ F. If the tunnel is provided with complete stationary end sections, as is preferable for mounting of the conveyor drive, exhaust plenum, and other auxiliary equipment, it is also difficult to obtain an adequate seal between the elevator-mounted base unit and the end sections of the tunnel housing. A unitary construction for the tunnel base of the tunnel cover, on the other hand, is also unsatisfactory, particularly for long tunnels, due to the high thermal stresses and the resultant structural distortion.

In any cryogenic freezing tunnel, it is highly desirable to apply the cryogen to the food products or other articles being frozen as a liquid spray; a vapor or partly vaporized spray is substantially less efficient. The cryogen, however, being under substantial pressure at the supply, tends to vaporize in the header and produce an undesirable mixed spray of gas and liquid. This can result in a substantial decrease in the efficiency of tunnel operation.

A related problem is the application of the cryogen to the bottom surfaces of the food products being frozen. The aforementioned U.S. Pat. No. 3,757,533 presents an arrangement for re-use of the liquid cryogen by collecting it in a pan below the spray header and allowing the conveyor belt that transports the food products through the tunnel to sag into the collection pan and thus bring the bottom surfaces of the food products into contact with the liquid cryogen. This arrangement, however, presents a substantial difficulty in maintaining the food products in aligned registration on the conveyor belt. The sag in the belt tends to shift the food products about on the belt surface. Furthermore, if the belt extends completely into the liquified cryogen, the food products may float on the cryogen. Either way, a jumbled and disorganized output from the tunnel results.

SUMMARY OF THE INVENTION

It is a principal object of the present invention, therefore, to provide a new and improved modular construction for a cryogenic food product freezing tunnel of the kind in which the base of the tunnel housing is mounted on elevators for movement between a raised sealed position and a lowered, open service position, a construction that effectively eliminates or minimizes the problems and difficulties discussed above.

A particular object of the invention is to provide a new and improved modular construction for a cryogenic food product freezing tunnel, of the kind utilizing an elevator-mounted housing base, which inherently eliminates or minimizes sealing problems by continuously holding the tunnel base units in sealed position through the application of pressure by the elevators themselves, with no mechanical latches. In achieving this object, an important feature of the invention is a provision for inclined interface surfaces between stationary end sections of the tunnel housing and the end modules of the base, together with a provision for moving the end base modules down to their open service position before any center module is lowered, in a predetermined sequence that is reversed for raising the base modules. Another related feature entails movement of the end base modules outwardly as well as downwardly in opening of the tunnel.

Another object of the invention is to provide improved gaskets for sealing the modular units of a cryogenic freezing tunnel, particularly a tunnel utilizing an elevator-mounted base. The gaskets employed in the invention are of low temperature silicone material with bonded protective coverings of polyfluoroethylene.

A further object of the invention is to provide expansion-contraction joint structures suitable for use in a cryogenic food product freezing tunnel, particularly a tunnel of the type employing an elevator-mounted base for the tunnel housing.

Another object of the invention is to provide for effective dual use of the cryogen, contacting the lower sides as well as the upper sides of the food products, without requiring two spray headers and without disturbing registration of the food products on the tunnel conveyor.

Another object of the invention is to provide a new and improved modular construction for a cryogenic food product freezing tunnel of the type using an elevator-mounted base that permits extended standby periods without excessive increase of temperature within the tunnel.

A further object of the invention is to provide a new and improved modular construction for a conveyor belt support utilized in a long cryogenic food product freezing tunnel.

Accordingly, the invention relates to a cryogenic food product freezing tunnel of the kind comprising an elongated tunnel housing, conveyor means extending through the housing to transport food product from an entrance end to an exit end, cryogen input means to introduce a cryogen into the tunnel at a cryogen input location near the exit end, and exhaust means to exhaust cryogen gas from an exhaust location near the entrance end; the tunnel includes a stationary structure comprising the cover of the tunnel housing, the conveyor means, the cryogen input means, and the exhaust means, the base of the tunnel housing being of generally U-shaped cross sectional configuration and being suspended from the stationary structure for movement between an elevated operational position sealed against the housing cover and a lowered, open service position.

The improved construction of the invention comprises a housing base that includes a plurality of at least three modular base units aligned end-to-end with individual base unit elevator means, for raising and lowering each modular base unit separately from the others. Guide means are provided for each end base unit to guide that end base unit along a path extending both downwardly and longitudinally outwardly of the center of the tunnel through a small horizontal displacement at the beginning of its downward movement toward its service position, and to guide that end base unit back along the same path at the end of its upward movement to its operational position. Elevator control and actuation means actuate the elevator means to raise and lower the end base units in a predetermined sequence such that both end base units are lowered to service position before any center base unit is lowered, and all center base units are raised to operational position before either end base unit.

In the preferred construction for the invention, each end base unit has side walls joining the side walls of a stationary housing end section along an interface inclined at an acute interface angle I to the horizontal. The elevator means each comprise a fluid pressure operated cylinder, and elevator control and actuation means includes seal maintenance means for maintaining a fluid supply of predetermined minimum pressure to all of the elevator means when the base units are in their raised operating position, thereby maintaining the tunnel sealed, without mechanical latches, regardless of thermal contraction of the tunnel housing. The interface surfaces between adjacent base units, between the housing base and the housing cover, and between the housing base and the housing end sections, are all preferably sealed by double-bulb sealing gaskets, each gasket comprising a body of low-temperature silicone material affording two hollow spaced tubular protrusions extending longitudinally of the gasket, and the gasket body is covered with a surface layer of polyfluoroethylene resin bonded to the gasket body.

In the preferred construction, an elongated liquid cryogen collection pan is located immediately below the cryogen input header between the upper and lower runs of the conveyor belt and extends for long distances longitudinally of the conveyor belt in both directions from the header. Conveyor belt guide supports direct the upper run of the open-mesh conveyor belt through the pan along a path comprising a long, very gradually inclined entrance segment, a long horizontal central segment, and a long, very gradual inclined exit segment; only the lower surface of the upper run of the conveyor belt contacts liquid cryogen in the pan to cause the liquid cryogen to boil and spatter against the under-surface of food products on the conveyor belt as those food products traverse the central segment of the path through the pan.

BRIEF DESCRIPTION OF THE DRAWINGS

FIG. 1 is a perspective view of a complete cryogenic food product freezing tunnel constructed in accordance with a preferred embodiment of the invention;

FIG. 2 is a perspective view, cut away in several areas to illustrate operating components, of the discharge end of the freezing tunnel with the base in its elevated, sealed operating position;

FIG. 3 is a detail sectional view of the joint seal between adjacent modular cover units in the tunnel;

FIG. 4 is a detail sectional view of a thermal contraction joint in the tunnel cover;

FIG. 5 is a detail sectional view, in perspective, of a thermal contraction slip joint in the wall of a base unit module for the tunnel;

FIG. 6 is a detail sectional view, in perspective, of a gasket employed for interface sealing between the base and the stationary structure of the tunnel;

FIG. 7 is a perspective view, partly cut away to illustrate operating components, of the entrance end of the tunnel, with the base lowered to its service position;

FIG. 8 is a side elevation view of the tunnel of FIG. 1;

FIG. 9 is a detail elevation view of a locating device for auxiliary equipment connected to the tunnel;

FIG. 10 is a detail sectional view of a portion of the cryogen spray header for the tunnel;

FIG. 11 is a side elevation view of a cryogen recycling unit incorporated in the tunnel;

FIG. 12 is a detail transverse sectional illustration of a part of the conveyor belt support for the tunnel;

FIG. 13 is a detail side elevation view of a part of the conveyor belt support of FIG. 12;

FIG. 14 is a detail transverse sectional view of a part of the conveyor belt support taken as indicated by arrows 14—14 in FIG. 11;

FIG. 15 is a detail sectional view of the fan mounting for the tunnel;

FIG. 16 is a transverse partly sectional detail view of one of the elevators for the tunnel base with the base in lowered service position;

FIG. 17 is a side elevation view of the elevator of FIG. 16 with the base in raised position;

FIG. 20 is a schematic diagram of the pneumatic control for the cryogen input to the tunnel; and FIG. 21 is an electrical circuit diagram for the electrical control for the pneumatic system of FIG. 20.

DESCRIPTION OF THE PREFERRED EMBODIMENT

Figure 18:
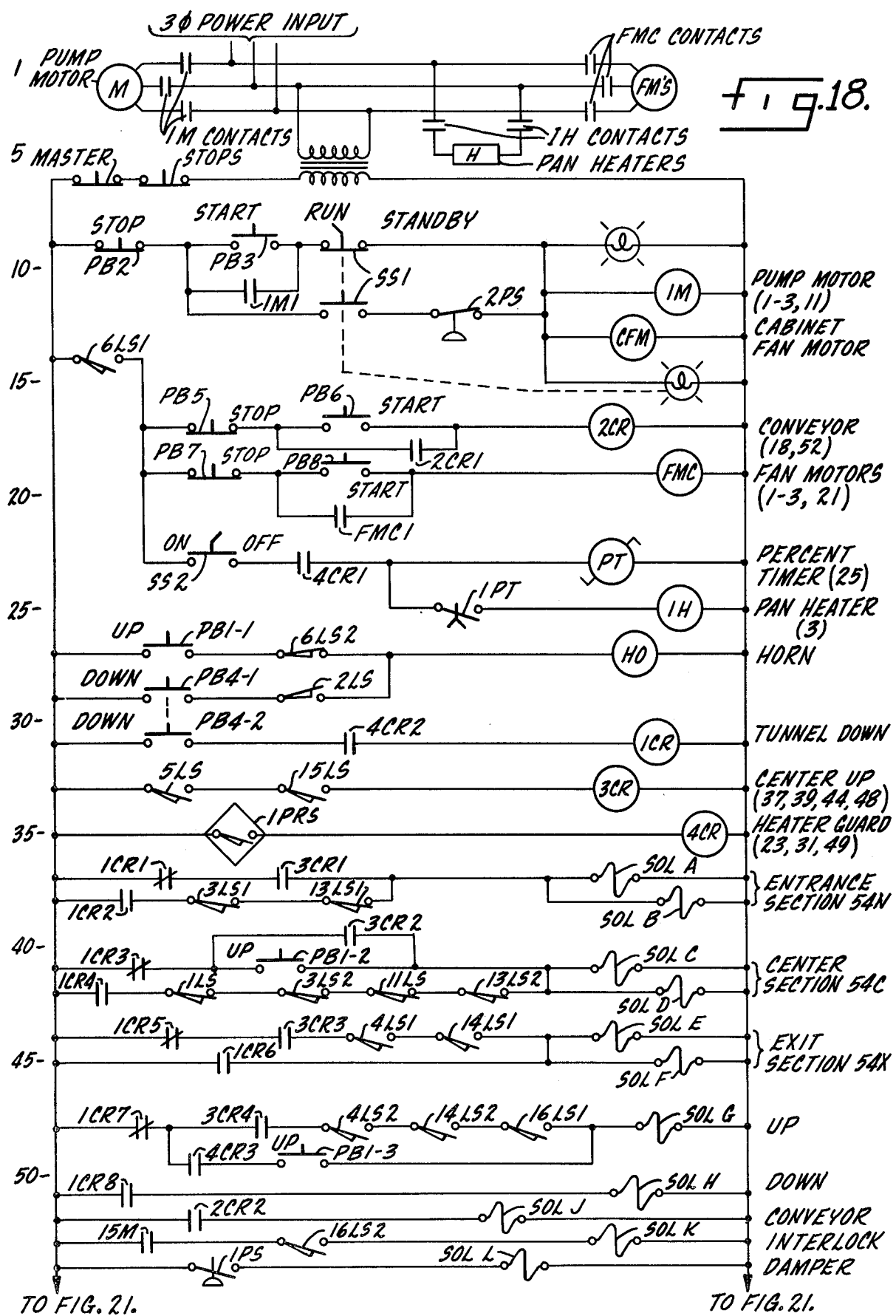
FIG. 18 is a schematic circuit diagram of the principal electrical control for the tunnel.

FIG. 1 illustrates a cryogenic freezing tunnel 30 for fast freezing of food products, constructed in accordance with a preferred embodiment of the invention. Tunnel 30 freezes the food products by subjecting them to a cryogenic liquid such as liquified nitrogen. Food products pass through the length of tunnel 30 on an open mesh conveyor of endless belt form from the entrance end 31 of the tunnel to its exit end 32. The cryogen is introduced into tunnel 30 near its exit end 32 through an insulated conduit 33, and is sprayed directly onto the food. Much of the cryogen flashes to gas upon contact with the food products. The cryogen which does not evaporate falls into a collection pan below the conveyor belt and is used for freezing the bottoms of the food products as described below.

Gas generated from the liquid cryogen is pulled toward the entrance end 31 of tunnel 30 by an external, roof-mounted exhaust blower (not shown) connected to an exhaust stack 34. The blower creates a draft which draws the gaseous cryogen from the spray area through the tunnel and exhausts it through stack 34. As gas progresses down the tunnel counter-current to the food product flow, a series of circulating fans driven by fan motors FM scrub the cold gas across the surfaces of the food products to extract as much available heat as possible. This pre-cools the food product so that contact with the liquid cryogen in the spray area below conduit 33 instantaneously freezes the food.

The freezing tunnel 30 can be adapted for use with hamburger patties, steaks, chicken pieces or patties, fish, or any other of a wide variety of food products. Various products have different characteristics requiring different amounts of exposure to a cryogen for proper freezing. Also, an optimum tunnel design might differ with varying production rates. A high-production tunnel, for economical operation, needs to extract the maximum possible refrigeration effect from the cryogen. This necessitates a long tunnel to provide space for forced convection heat transfer; tunnel 30 is typically sixty-five to eighty-five feet long. Tunnel 30 comprises three similar tunnel housing modules, an entrance module 35, a center module 36, and an exit module 37. The tunnel housing modules are separate units joined end-to-end in a completed tunnel to form a unitary, enclosed chamber.

Each housing module is constructed essentially like the others, without regard to how many modules will be joined together or what ultimate position a particular housing module might occupy in a tunnel. The housing modules in a preferred embodiment are each twenty feet long. This modular concept provides a simplified, flexible means of constructing tunnels in basic lengths of forty, sixty or eighty feet or longer to accommodate whatever freezing and production criteria the user might have.

Each of the housing modules 35–37 is supported by four leg assemblies 38. Each leg assembly 38 includes an upright enclosure containing support means for the tunnel housing. The leg assemblies 38 are joined by upper and lower longitudinal frame rails 39 and 41 respectively. Transverse braces 47 between the bottoms of the legs provide for additional rigidity. Frame rails 39 and 41 serve as conduits for electrical and hydraulic lines, respectively.

Special equipment associated with the entrance end 31 of tunnel 30, which accepts unfrozen food products, is collected in an entrance end closure section 42. This relatively short section, typically less than three feet in length, contains equipment for performing a variety of tasks explained below in detail. Features readily apparent in FIG. 1 are an exhaust plenum 43 connecting the tunnel to stack 34, an entrance door 44, and a hydraulic belt tensioning pump 45. Door 44 is shown closed in FIG. 1, closing the entrance opening to tunnel 30. Entrance closure section 42 is supported by two legs 46 and is connected to the entrance module 35 by frame members 39 and 41.

Special equipment associated with the exit end 32 of the tunnel 30 is placed in an exit end closure section 48. Like the entrance closure section 42, exit section 48 is a short section supported by two legs 46. It is connected to the exit module 37 by longitudinal frame members 39 and 41. Components visible in FIG. 1 include a control cabinet 49 for electrical, hydraulic and pneumatic control equipment and a hydraulic conveyor drive motor 50. There is also an exit door (not shown) capable of sealing the tunnel exit when the tunnel is not in use.

The Tunnel Housing—General Construction

The purpose of tunnel housing modules 35–37 and end sections 42 and 48 is to provide a freezing chamber for the food products and a containment vessel for the refrigerant liquid and gas. This requires a completely sealed environment, except for entrance and exit openings for the food products. The inner surface of the tunnel housing is subjected to extremely cold temperatures, ranging down to about $-320°$ F. if liquid nitrogen ($LN_2$) is used. The outer surface of the housing is at ambient room temperature. The housing has to maintain this temperature gradient, that is, prevent excessive heat transfer and preclude all refrigerant leakage, without buckling or warping under the high thermal stress. In addition, sanitary conditions must prevail at all times in and around the tunnel housing; thus, some way to clean the tunnel must be provided along with access for inspecting the tunnel. These last requirements militate strongly against a tunnel housing of unitary construction. In fact, in the tunnel length contemplated here of about sixty-five feet, inspection and cleaning requirements preclude the use of a one-piece housing. Accordingly, each housing module is constructed as two generally flat horizontal cover units 52 joined end-to-end and covering a three-sided, generally U-shaped base unit 54. This arrangement is essentially similar to that shown in U.S. Pat. No. 3,757,533. The division into cover and base units makes it possible to lower the base units for cleaning and inspecting. In the modular concept of the present invention, each ten foot top unit 52 is rigidly attached to two legs 38 and is therefore stationary at all times. The twenty foot base unit 54 of each module can be raised and lowered through the use of elevator means located in the leg assemblies 38. When raised the base units and top units define a continuous freezing chamber 56 extending through tunnel 30 (see FIG. 2).

Details of the cover construction for tunnel 30 are best seen in FIGS. 2, 3 and 7. FIG. 2 shows the cover units 52X of the exit module 37, but the cover units of the entrance and center modules 35 and 36 use the same construction. Each cover unit 52 has a generally flat rectangular cross-section except that the lower part of each lateral edge 58 has a rabbet 60 where the cover unit joins the vertical walls of base unit 54. Each top unit 52 consists of a thick slab of insulation 62 completely covered by sheet metal envelope 64 (FIG. 3). The insulation 62 can be polyurethane foam or other suitable insulating material. Stainless steel is preferably employed for the sheet metal envelope 64.

Returning to FIG. 2, it is seen that each cover unit 52 is supported by two legs 38. Each cover unit is rigidly fastened at its lateral edges to the tops of the leg assemblies. The connection includes a spacer 68 to provide clearance between the tunnel housing and leg assembly for raising and lowering base unit 54 (exit base unit 54X in FIG. 2).

As mentioned above, the thermal stresses induced in the housing of tunnel 30 by the severe temperature gradients could cause buckling and warping of the housing walls. To preclude such warping or buckling, each cover unit 52 is provided with one or more thermal contraction joints 70. A cross section of such a joint is shown in FIG. 4. Each thermal contraction joint 70 comprises an inverted V-shaped recess in the bottom 66 of a cover unit 52. The recess extends the full width of the top unit. The peak of the recess is rounded to relieve stress concentration and to make it easier to line the recess with sheet metal. The height of each thermal contraction joint 70 is less than the height of rabbet 60 so that the thermal contraction joints do not present a sealing problem for the tunnel housing.

The joint between adjacent cover units 54 is sealed by a clothes-pin gasket 74 as shown in FIG. 3. Gasket 74 is made of low-temperature silicone material with a bonded Teflon covering 75 on its depending legs 76. The upper portion 78 of gasket 74 has a metal stiffening strip 77 embedded therein. The extreme ends of the metal strip 77 can be extended to afford convenient "handles" for removing gasket 74 if necessary, as in the case of long-term maintenance. Legs 76 of gasket 74 expand and contract as necessary to maintain a seal between the end surfaces 67 of adjacent cover units 52. This same seal construction 74 is also used between the cover unit of entrance module 35 and entrance closure section 42 and at the junction between the cover unit of exit module 37 and exit closure section 48 (FIG. 1). Since the cover units 52 are always stationary once they have been installed in a tunnel, the clothes-pin gasket 74 is not required to accommodate any separation of adjoining units 52 in normal operation or even regular short-term maintenance.

FIG. 2 affords the best cross-sectional view of one of the base units 54. Base unit 54X is a three-sided, generally U-shaped channel. The top edges of the side walls are bevelled to form shoulders 80 which fit into the rabbet portion 60 of the cover units 52. Like the cover units, each base unit segment is constructed as a thick layer 82 of foam insulation or other thermal insulation enclosed in a sheet metal skin 84,85, again preferably stainless steel (see FIG. 5).

Each twenty foot modular base unit 54 consists of four five foot sub-modules 90 (FIGS. 1 and 2). Again, this is done to provide for sufficient thermal expansion and contraction in the tunnel housing to prevent buckling or warping. Each adjacent pair of five foot sub-modules is joined by a slip joint 92 like the one shown in FIG. 5. Each sub-module has an end cap 94, comprising a sheet metal channel, welded between the sheet metal surface elements 84 and 85. The internal surface elements 84 of adjoining sub-modules abut against each other and are welded together at a weld 95. This makes a continuous inner surface in each complete base unit 54. The external sheet metal surface elements 85 do not extend beyond the flange 96 of the end cap 94. This leaves a gap 98 for expansion and contraction of the external surfaces. Gap 98 is covered by a slip joint shield 100. Shield 100 is bolted or otherwise secured to a backup plate 102 on the inside of slip joint 92. The external surfaces 85 can thus slide relatively freely in the slot formed between the joint shield 100 and backup plate 102.

When a base unit 54 is in elevated position, as unit 54X shown in FIG. 2, a seal between the base unit and the related cover units 52 is effected by a double bulb gasket 104 shown in detail in FIG. 6. Like the clothes-pin gasket 74 described above, gasket 104 has a body 105 made of low temperature silicone material with a covering 106 of tetrafluoroethylene resin (Teflon) or other polyfluoroethylene resin. The gasket body 105 includes two long, spaced tubular air passages 103. This construction allows the gasket to remain flexible throughout the temperature range to which it is exposed. The bonded covering 106 prevents entrapment of dirt in the gasket and allows the gasket to release from its mating surface when cold, avoiding the tendency of the silicone material to adhere to a metal surface. The double-bulb construction assures a tight seal even as the housing of tunnel 30 responds to substantial thermal stresses. Two double bulb gaskets 104 are affixed to the lower edge surfaces of each cover unit 52 in position to engage the top surfaces of the base unit side walls, as indicated in FIG. 2. Each gasket 104 extends for the entire length of each cover unit 52. There are similar interface gaskets between the cover units and the base sections of the other tunnel housing modules and the end sections of the tunnel housing.

The Entrance End of the Tunnel

The entrance end housing closure section 42 of tunnel 30, best shown in FIG. 7, employs a wall construction much like that of the modules 35–37. Section 42 adjoins the entrance module 35. The cover 107 of entrance section 42 is sealed to the outermost cover unit 52N of entrance module 35 by one of the clothes-pin gaskets 74 in a sealed joint of the kind shown in FIG. 3 and described above.

The side wall 108 of end section 42 has an inclined end surface 109 that mates with a corresponding inclined end surface 110 on the side wall 111 of an end extension for the base unit 54N of entrance module 35 (FIGS. 7 and 8). The base unit extension side wall 111 is joined to the base unit by one of the slip joints 92.

The housing end section 42 does not have an elevator-mounted base unit like those of the tunnel modules 35–37. The mating inclined surfaces 109 and 110 between end section 42 and entrance module 35 accommodate longitudinal motion of base unit 54N of entrance module 35 in raising and lowering of the base unit, as explained later. An interface gasket like gasket 104 is provided between surfaces 109 and 110 to seal section 42 to module 35.

Several mechanisms associated with the entrance end 31 of tunnel 30 are shown mounted in entrance section 42 (FIG. 7). These include one end of an open mesh conveyor belt 112 that extends for the full length of tunnel 30. Belt 112 extends around a conveyor tensioning pulley 118 mounted on a shaft 120 connected to pump 45. Located near pulley 118 are two frost removal brushes 122. Brushes 122 brush frost from the conveyor to maintain the mesh open for maximum gas circulation. These brushes are especially designed for use in a food product freezing tunnel. An ordinary brush is quite unsatisfactory, even if effective to purge the conveyor belt of frost, because conventional brush bristles are so closely packed that the brush cannot be examined for cleanliness. In brushes 122 the bristles are not closely nested but on the contrary are widely separated in both rows and columns so that the spaces between the bristles may be easily inspected for any unacceptable entrainment. A preferred brush construction is described and claimed in the co-pending application of Glenn A. Sandberg, Ser. No. 847,720, filed Nov. 2, 1977. Frost brushed from belt 112 falls into a pan 124. Pan 124 is heated by electrical heaters to melt collected snow and the water is then drained away. Pan 124 has a guard for the electrical heaters (not shown) that is lowered during service operations.

Pump 45 (FIG. 7) acts as a brake on the tensioning pulley 118; the pump outlet is connected to an adjustable relief valve, as described below, to prevent the pump, shaft 120, and pulley 118 from turning until tension in belt 112 builds up to a desired level. This provides a means to control the conveyor belt tension by adjusting the setting of the relief valve. This belt tensioning apparatus is described and claimed in the co-pending application of Glenn A. Sandberg, Ser. No. 847,719, filed Nov. 2, 1977.

In FIG. 7, the entrance door 44 of housing section 42 is shown in closed position. During tunnel operation, door 44 is raised to permit discharge of food products onto belt 112. Like the other wall members of the tunnel, door 44 is constructed as a thick layer of insulation with an encompassing metal sheath.

Two locating devices 128 for mating equipment are also mounted on entrance section 42; one of these devices is shown in FIG. 7. FIG. 9 is a detailed illustration of the locating device. An infeeding conveyor 130 or other mating equipment has a clip 132 with a socket 134 formed therein. Socket 134 fits over a ball 136 on the end of a screw 138. Screw 138 is threaded into an arm 139 which is mounted on the end wall of housing section 42. Screw 138 provides for vertical adjustment of the mating equipment location. Longitudinal and transverse alignment are determined by the fixed position of arm 139. Thus, the infeeding conveyor 130 can be accurately located for transferring food products to the conveyor belt 112 at the entrance of the freezing tunnel.

The Exit End of the Tunnel

Like the entrance end 31, the exit end 32 of tunnel 30 is provided with a short housing section, section 48. In FIGS. 2 and 8, it is seen that exit end section 48 is similar in configuration to the entrance end section 42. At the top, end section 48 is connected to the outermost cover unit 52X of exit module 37 by one of the clothes-pin gaskets 74. An inclined end unit 144 is attached to the exit base unit 54X by one of the slip joints 92. The side walls 140 of end section 48 are of complementary inclined configuration (FIG. 8).

The hydraulic conveyor drive motor 50 (FIG. 2) is connected to a conveyor drive pulley 146 by a drive shaft 147. Just after passing over drive pulley 146, the lower (return) run 114 of conveyor belt 112 falls into a catenary sag 148 between the drive pulley and an idler pulley 150. The idler pulley maintains a limited tension in the lower run 114 of conveyor belt 112. All of the slack in the belt is in the catenary sag 148.

Exit end section 48 is also equipped with an exit door (not shown) for sealing off the exit when the tunnel is not in use.

Liquid Cryogen Input

The liquid cryogen input system is best seen in FIGS. 2 and 10; as noted above, cryogen may be liquified nitrogen (LN$_2$). The input system includes the supply conduit 33 from an external storage supply (not shown). Conduit 33 is provided with thermal insulation 152 to prevent excessive heat transfer before introduction of the liquid nitrogen into tunnel 30. A flow rate control valve V21 regulates the rate of liquid nitrogen injection into the tunnel. The control logic and associated circuitry for the valve are discussed in detail below.

A spray header 156 is suspended from the outermost cover unit 52X of exit module 37 (FIG. 2). Header 156 directs a spray of liquified nitrogen onto the food products passing underneath. As shown in FIGS. 2 and 10, spray header 156 comprises a plurality of large diameter tubes 157 having a series of liquid spray nozzles 158 on the bottom of the tube and one or more gas relief nozzles 160 on the top. There may also be a series of liquid spray nozzles 159 at the side of the tubes 157 (FIG. 10). This construction maintains separation of the gas and liquid phases of the cryogen in the header tubes, allowing any cryogen that becomes vaporized in the header to escape from the top and creating an even flow of liquid out of the bottom (and side) nozzles and onto the food products. Thus, the header itself acts as a phase separator for the cryogen.

Food products passing beneath spray header 156 receive a direct spray of liquid nitrogen. Most of the liquified nitrogen impinging on the food products flashes to gas, but some may drain off as liquid. Another part of the liquid cryogen spray passes directly through the spaces between the food products and through the open mesh belt 112. This liquid nitrogen is collected in a pan 162 (FIG. 2) located between the upper and lower runs of conveyor belt 112. A pool of liquid nitrogen collects in pan 162. In modules of the length contemplated here, that is, on the order of twenty feet, the collection pan 162 preferably extends for the full length of an entire module as shown in the cutaway sections of FIG. 2.

Module 37 incorporates supports for the upper run 116 of belt 112 that direct the conveyor belt down into pan 162 at a very gradual decline. The upper run 116 of belt 112 travels at this lower dip level, close to the bottom of pan 162, for a substantial distance, and then comes up another gradual incline to the normal level for the upper run of the belt. As the liquid nitrogen, at about −320° F., makes contact with the underside of the relatively warmer belt at the dip level, active boiling of the cryogen occurs. The resulting surface agitation of the cryogen causes droplets of liquid nitrogen to spatter through the open mesh of the conveyor belt, contacting the underside of the food products on the belt. In effect, this creates a system for spraying the bottom surfaces of the food products, and increases the production efficiency of the tunnel.

A detailed illustration of collection pan 162 and the related segment of belt 112 is presented in FIG. 11. This long pan (twenty feet in tunnel 30) allows for very gradual inclines of the conveyor belt down into and back out of the collection pan. As seen in FIG. 11 the downward incline of the upper run 116 of belt 112 extends over a pan segment 164 of approximately eighty inches in length. Then the belt runs through the pan at the dip level through another segment 166 of about another eighty inches. A third inclined segment 168 of about eighty inches raises the belt run 116 back out of pan 162. Segments 164, 166 and 168 must be at least several feet long to keep the food products steady in their positions on the belt. Any abrupt sag in the belt can easily cause a loss of registration of the food products, which is quite undesirable from the standpoint of both spray header efficiency and take-away conveyor configuration. Consequently, the dip in run 116 of belt 112 has not been effected by simply allowing a sag in the belt. To the contrary, the tension in the upper run 116 of the belt is maintained throughout its entire length, and the belt is guided into pan 162 throughout segments 164, 166 and 168. The weight of the metal mesh belt creates sufficient hold-down force to keep the belt in contact with its support guides throughout the length of pan 162. The dip level 166 is high enough to prevent complete submergence of the belt in the liquid pool. Totally submerging the belt would allow the food product to float on the liquid cryogen, creating substantial registration problems.

As noted above, conveyor belt 112 is of open mesh construction, allowing maximum gas circulation through the belt as it traverses tunnel 30. The open mesh also permits freezing of the underside of the food products and thorough frost removal by brushes 122.

The belt is supported by a series of belt support assemblies 170; one assembly 170 is shown suspended from the entrance module cover unit 52N in FIG. 7. Each tunnel module has three such support assemblies, each approximately eighty inches in length. The assemblies 170 are spaced from each other by short gaps 171 to allow for expansion and contraction. Each assembly 170 consists of four hangers 172 attached to the cover unit of a module, two hangers on each side of the cover unit. Two edge guides 174 are attached to each hanger 172 to maintain lateral alignment of the belt. The belt is supported at its edges on upper and lower runners 176 and 178. Diagonal braces 180 lend rigidity to the support assembly 170.

FIGS. 12 and 13 show the support assembly details. Only one side of an assembly 170 is shown; the following description applies to both sides of the conveyor support frame assembly. Located just below the upper runner 176 is a longitudinal side brace 184. Brace 184 extends the full length of frame assembly 170 and is attached to three tie plates 182 and to the two hangers 172 by a bolt 186 which extends through a spacer 188. The diagonal braces 180 are also affixed through spacers 188 to side brace 184. Transverse rods 190, one located at each of the tie plates 182, connect the two sides of the frame assembly. Upper runner mounting brackets 192 are provided, one at each tie plate and hanger. These brackets are welded to the side brace 184 and support the upper runner 176. Lower runner mounting brackets 194 support the lower runner 178 on the hangers and tie plates.

Runners 176 and 178 and guides 174 are each fitted with a C-shaped bearing surface element 196 of high density polyethylene. These can be replaced when worn; they minimize wear on the belt and prevent damage to the runners. As best seen in FIG. 13, the tips of runners 176 and 178 are both flared downwardly at gap 171. This precludes snagging of the belt that might otherwise be caused by slight differences in the elevations of adjoining runners. The edge guides 174 are similarly bent slightly outwardly at their ends to prevent catching on the conveyor belt.

As is apparent from the prior discussion of collection pan 162, a special conveyor belt support is provided in exit module 37, FIG. 2. This support is shown in detail in FIG. 14. The upper run 116 of the conveyor belt is shown in phantom at its normal height at 116A and at 116B at its dip level in section 166 of pan 162 (see FIG. 11). The upper runner 176 is inclined to carry the belt between the two levels. The upper runner mounting bracket 192A is supported, in this instance, from the bottom of the collection pan 162. Tie plates 182 support the lower runner 178 as described above for FIGS. 12 and 13. Transverse rods and expansion gaps are also provided as previously described.

Exhaust System

Control of flow of the vaporized cryogen is essential to proper operation of a cryogenic freezing tunnel. Most of the liquid nitrogen or other cryogen flashes to gas as soon as it hits the food product, so gaseous cryogen must be removed. Also, the open tunnel ends may allow some penetration of air into the tunnel. To the fullest extent possible, it is desirable to keep air out of the tunnel to promote efficiency and to limit condensation of moisture in the tunnel.

A split exhaust plenum 43, divided by a central partition 201, is used to limit the amount of air entering tunnel 30 and to remove the nitrogen gas, as partly shown in FIG. 7 and schematically illustrated in FIG. 20. On the right-hand side of plenum 43, the side adjacent the tunnel entrance, a manually adjusted room air damper 202 controls the exhaust of room air entering the entrance opening of the tunnel. In the tunnel side of plenum 43 there is an automatically controlled tunnel gas damper 204 actuated by a pneumatic damper cylinder 206. The cylinder is connected to a pneumatic system which is responsive to the operating condition of the main cryogen flow rate control valve V21 (FIGS. 2 and 20). Whenever valve V21 is open, the tunnel gas damper 204 is held open. When the liquid nitrogen flow is cut off at valve V21, cylinder 206 is actuated to close the tunnel gas damper 204. This cuts off the tunnel from the exhaust blower connected to stack 34, so that the blower does not draw room air into the tunnel.

During production, in tunnel 30 the vaporization of the volatile cryogen tends to create an internal pressure slightly above the ambient room pressure. This also helps to prevent entry of room air into the tunnel through its food product entrance and exit openings in end sections 42 and 48 (FIG. 1).

Extraction of the full refrigerant value of the cryogen requires scrubbing the gas against the food products as the gas and products flow counter-current through the tunnel. The scrubbing action is enhanced by a series of circulating fans 208 driven by the fan motors FM (FIGS. 1,2); the mounting for one of the fans 208 is shown in FIG. 15. The fan blade 208 is designed to create a uniform flow pattern across the entire width of the conveyor belt in tunnel 30. The fan motor FM rests on a mounting pad 210 secured to the outer surface 64 of one of the cover units 52. In addition to the usual motor shaft seal another seal 212 around the fan shaft 216 is provided at the underside of the mounting pad. A reservoir 214 is thus created between seal 212 and motor FM. Any bearing lubricant lost due to bearing or seal failure is trapped in reservoir 214. This double sealing precludes the possibility of the food products being contaminated as they pass beneath the fans in tunnel 30.

Base Unit Elevator System

The tunnel modules 35-37, as described, each include two stationary top units 52 and one vertically movable U-shaped base unit 54. Elevator means for raising and lowering the base units are incorporated in the module leg assemblies 38, as shown in FIGS. 2, 16 and 17. Each elevator means comprises a hydraulic elevator cylinder 217 and a piston rod 218, mounted within a three-sided leg housing 220 including top and bottom plates 222 and 224; the housing is open on the side facing the tunnel. Mounted on the bottom plate 224 is a height adjustment foot 226. The elevator cylinder 217 is mounted on the top 222 of the leg assembly by a pivot 228. This mounting allows cylinder 217 to pivot in a direction parallel to the length of the tunnel. A bracket 229 attached to the end of the piston rod 218 supports the module base unit 54. The side of the leg near the tunnel housing is left open to permit passage of the bracket up and down during operation of the cylinder. FIG. 16 shows base unit 54 in the lowered, service position; FIG. 17 shows it raised to its operational location.

To avoid a scrubbing action on the surfaces of the interface gaskets between tunnel base units 54 and the gaskets between the module base units and end sections 42,48, longitudinal movement of the base units is provided, in conjunction with their lowering and raising movements. In a preferred lowering sequence, the base unit 54X of exit module 37 is lowered first, followed by the base unit 54N of entrance module 35, with the base unit 54C of the center module 36 the last to move down (see FIG. 1). Longitudinal spacing is attained by use of cam tracks 230 located on the inside surface of the leg enclosures 220 (FIG. 17). A roller follower 232 mounted on bracket 229 engages the cam track 230; the cam portion 231 of track 230 displaces the bracket 229 horizontally as the bracket begins its downward movement. For example, for the exit module base unit 54X the cam tracks direct the base unit on a diagonal line downwardly and horizontally toward the exit end of the tunnel at the beginning of its downward movement, as shown by the arrows X in FIG. 8. The entrance unit cam tracks direct the entrance base unit 54N both outwardly and downwardly as indicated by arrows N in FIG. 8. This motion pulls the end base units 54N and 54X away from the center base unit 54C so that the interface gaskets are not subjected to shearing forces. Base unit 54C moves only vertically; see arrows C, FIG. 8.

The angle of the cam portion 231 of each track 230 is made substantially steeper than the angle of the interfacing surfaces between the base units of the tunnel end modules and the fixed end sections of the tunnel; compare the cam portion 231 (FIG. 17) with the mating surfaces 109 and 110 (FIGS. 7 and 8). A better illustration of this relation is provided in FIG. 20. As shown there, base unit 54N initially descends at a descent angle D substantially steeper than the interface angle I. The same rotation is maintained at the opposite end of the tunnel. Furthermore, the relationship applies to elevation movements of the end module base units as well as to descent movements.

On raising the modular base units 54 for operation of the tunnel the sequence is reversed. The center base unit 54C is raised first, then the entrance and exit units 54N and 54X are each moved straight up until the cam tracks 231 direct the base units longitudinally toward the center unit. This motion reseals the tunnel. The elevator cylinders 217 continue to receive pressure fluid to maintain all base units in their raised position, once elevation is complete; no mechanical latches are needed to maintain tunnel 30 in sealed operational condition.

FIG. 8 shows the major components of the housing of tunnel 30 and how they fit together. The entrance, center and exit modules 35, 36 and 37 are joined by interface gaskets 104 and clothes-pin gaskets 74. Each of these modules comprises a base unit 54, separately identified as units 54N, and 54C and 54X, respectively, and two cover units 52 separately identified as 52N, 52C and 52X. Each base unit includes four sub-modules 90 joined by slip joints 92.

In order to eliminate the labor cost of daily start-up, shutdown, and clean-up, and the liquid nitrogen cost of daily cool-down, tunnel 30 is designed to be sealed at the end of a day's production and to maintain an acceptable freezing chamber temperature until the beginning of the next day's production. Features contributing to this overnight standby capability are the enclosure doors (e.g., door 44) on the entrance and exit sections of the tunnel housing and the automatic control for the tunnel gas damper 204. A temperature controller is provided which can maintain a constant temperature in the tunnel housing overnight.

Electrical and Hydraulic Control System

Figure 19:
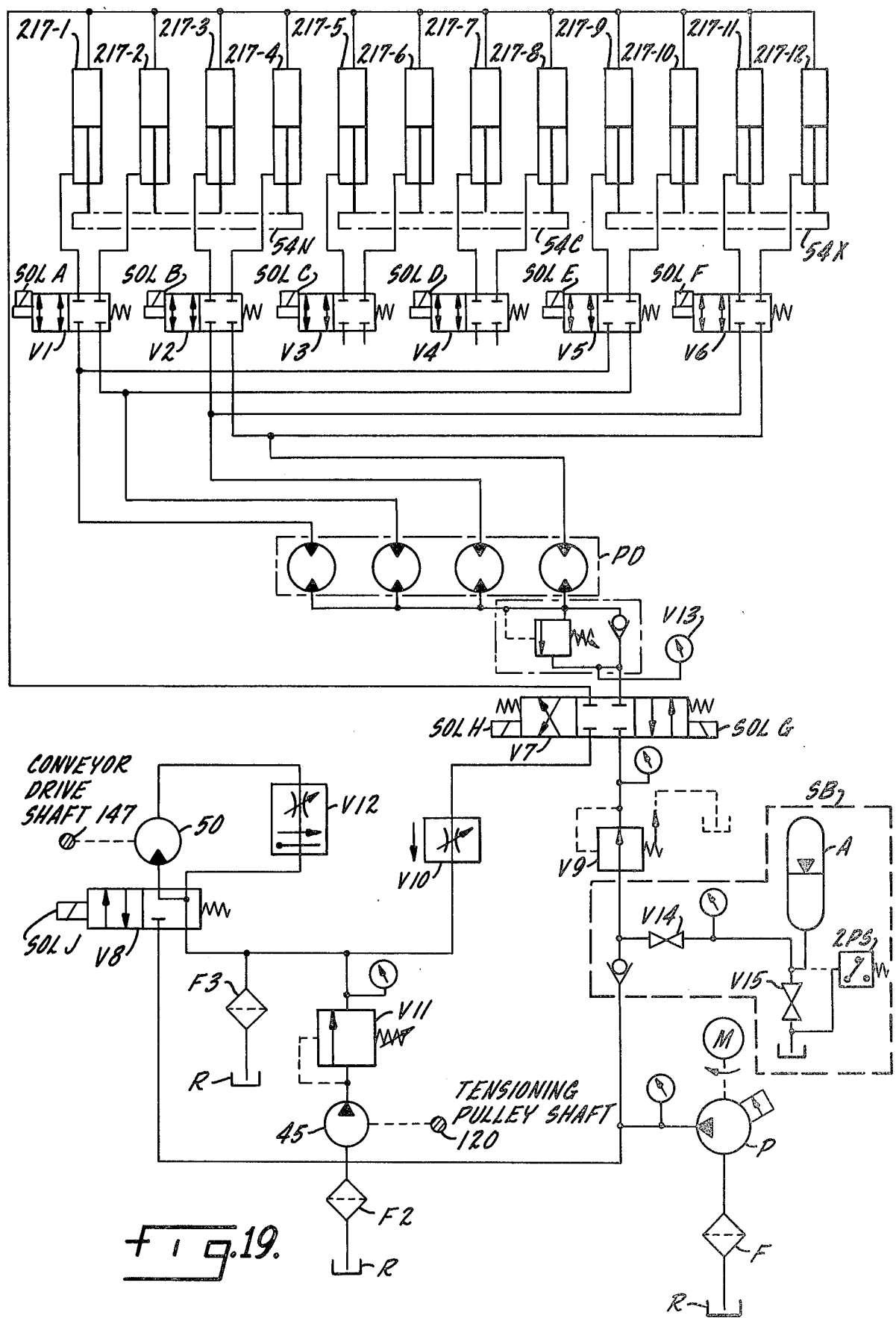
FIG. 19 is a schematic diagram of the hydraulic actuation system for the tunnel elevators and the tunnel conveyor.

The principal electrical control for the cryogenic freezing tunnel 30 is shown in FIG. 18; the hydraulic power system is shown schematically in FIG. 19 and the pneumatic system for the tunnel is illustrated schematically in FIG. 20. In FIG. 18 some simplification of the main electrical control has been effected. Thus, the electrical circuit of a commercial tunnel would include a number of indicator lamps, not shown in FIG. 18, to inform the tunnel operator of current operational conditions for the tunnel. All of the fan motors FM are shown as a single consolidated unit in FIG. 18, and only one fan motor contactor coil FMC is incorporated in the drawing; with a total of seventeen fans (see FIG. 1) a number of motor contactors and contactor operating coils are necessary for practical implementation of the electrical control. On the other hand, all of the principal control components are shown in FIG. 18, and the basic operation of the tunnel can be fully described based upon FIGS. 18–20.

In considering the operation of the electrical control and the hydraulic and pneumatic power systems for tunnel 30, it is assumed at the outset that all of the tunnel base units 54N, 54C and 54X have been lowered, as they would be for cleaning or other maintenance or service operations, and that the snow removal pan 124 has been opened for cleaning or servicing. All limit switches in FIG. 18 are shown in the operational positions that they would have for this condition of the tunnel.

When it is desired to place tunnel 30 in operation, it is first necessary to close snow removal pan 124 to its operational position. This closes a proximity switch 1PRS, line 35 in FIG. 18, and completes an operating circuit to a snow removal pan control relay 4CR. As a consequence, the relay contacts 4CR1 (FIG. 18, line 23), 4CR2 (line 31), and 4CR3 (line 49) all close. However, no additional operating circuits are established as yet because a selector switch SS2 (line 23) is in its "OFF" condition, a switch PB4 (line 29) is open, and a switch PB1-3 (line 49) is also open.

The next action taken by the operator, in placing tunnel 30 in service, is to close a start switch PB3 (line 9). This completes an operating circuit for a pump motor contactor coil 1M, FIG. 18 line 11, and a control cabinet ventilating fan motor CFM (line 13). As a consequence, the contacts 1M in the power circuit for a pump motor M, FIG. 18 lines 1–3, are all closed, and a main hydraulic pump P (FIG. 19) is placed in operation. A holding circuit for coil 1M is established through the contacts 1M1 (FIG. 18 line 11).

Before tunnel 30 can be placed in operation, it is necessary to elevate all of the base sections 54 to close the tunnel. To this end, the operator closes three start switches PB1-1 (line 27 in FIG. 18), PB1-2 (line 41) and PB1-3 (line 49). These three switches are all part of a single switch mechanism actuated by a single pushbutton. When the PB1 switch is first closed, section PB1-1 completes an operating circuit because limit switch 6LS2 is closed, sounding the horn HO as the tunnel sections 54 are being raised. Operational circuits are also established through switch section PB1-2 to two center section elevator solenoids SOL C and SOL D and through switch section PB1-3 to a lift solenoid SOL G.

Referring to FIG. 19, when solenoid SOL G is energized a directional control valve V7 is shifted to the left, supplying hydraulic fluid under pressure to a delta flow pressure divider PD through a counterbalance valve V13 and also establishing a complete return circuit, through an adjustable flow rate control valve V10, from the tops of the hydraulic elevator cylinders 217-1 through 217-12. Thus, energization of solenoid SOL G conditions the hydraulic system of FIG. 19 for elevation of all of the tunnel base units 54. The essentially simultaneous energization of solenoids SOL C and SOL D actuates two valves V3 and V4 to complete a hydraulic input circuit to the bottom of each of the elevator cylinders 217-5 through 217-8; these are the cylinders for center base unit 54C. As a consequence, upward movement of center base unit 54C is initiated. When center base unit 54C reaches its fully elevated position, sealed against the center cover units 52C of the tunnel, two limit switches 5LS and 15LS (FIG. 18 line 33) close, establishing an energizing circuit for a center lift control relay coil 3CR.

With coil 3CR energized, the control relay contacts 3CR1 through 3CR4 (FIG. 18 lines 37, 39, 44,48) are all closed. Contacts 3CR2 establish a holding circuit around the start switch section PB1-2. Closing of contacts 3CR3 and 3CR4 has no present effect, due to open limit switches in series with each of these sets of contacts. With contacts 3CR1 closed, on the other hand, two solenoids SOL A and SOL B are energized.

As shown in FIG. 19, energization of solenoids SOL A and SOL B actuates two valves V1 and V2 to an operating condition in which they supply fluid under pressure to the bottom of each of the elevator cylinders 217-1 through 217-4. Accordingly, the entrance base unit 54N of tunnel 30 begins to move upwardly toward its closed position. When it reaches its fully elevated closed position, two limit switches 4LS1 and 14LS1 (FIG. 18 line 44) are closed. Since contacts 3CR3 are already closed, this completes an operating circuit to each of two solenoids SOL E and SOL F. These solenoids actuate two valves V5 and V6 (FIG. 19) to operating conditions that initiate a supply of high pressure fluid to the bottom of each of the elevator cylinders 217-9 through 217-12 for the exit base unit 54X of the tunnel.

When the exit section 54X of the tunnel base reaches its fully elevated closed position, a limit switch 16LS1 (FIG. 18 line 48) closes. In the same circuit, relay contacts 3CR4 are already closed; furthermore, two limit switches 4LS2 and 14LS2 in this circuit were closed when the center base unit 54C reached its fully elevated position. Accordingly, a holding circuit in parallel with pushbutton switch PB1-3 is established for the directional valve solenoid SOL G for valve V7 (FIG. 19).

When the last of the base units for the tunnel, the exit module base unit 54X, has been raised to fully elevated position, three additional limit switches 6LS1, 6LS2 and 16LS2 are also closed. When the exhaust fan for stack 34 (control not shown) is placed in operation, a set of contacts 15M in series with switch 16LS2 (FIG. 18 line 53) are closed so that an energizing circuit is completed for the interlock solenoid SOL K in the pneumatic system of the tunnel (FIG. 20). This permits initiation of a flow of liquid nitrogen into tunnel 30 as described hereinafter.

The closing of switch 6LS1, FIG. 18 line 14, is a pre-condition for energization of the conveyor and other operating elements of the tunnel as described below. The opening of switch 6LS2 (line 27) shuts off the horn HO to inform the tunnel operator that closing of the tunnel is completed; the horn sounds to warn of tunnel base movement. The operator then releases the three section "up" pushbutton switch PB1. However, the operating solenoids SOL C, SOL D and SOL G are all held energized by the holding circuits in parallel with switch sections PB1-2 and PB1-3. Solenoids SOL A, SOL B, SOL E and SOL F also remain energized. Thus, the hydraulic system of FIG. 19 maintains tunnel 30 sealed, except for the food product entrance and exit openings, regardless of thermal contraction or expansion.

The next step in placing tunnel 30 in operation is to start conveyor 112. This is accomplished by the operator closing a switch PB6, FIG. 18 line 17 to establish an operating circuit for a control relay coil 2CR, through the closed limit switch 6LS1. Contacts 2CR1 (line 18) are closed to maintain a holding circuit for coil 2CR. In addition, the contacts 2CR2 (FIG. 18 line 52) close to afford an energizing circuit for a solenoid SOL J. As shown in FIG. 19, energization of solenoid SOL J actuates a valve V8 to an operational condition in which fluid under pressure is supplied from the hydraulic pump P to the conveyor drive motor 50. The conveyor is started and continues to run until subsequently shut down.

Valve V12 can be adjusted to regulate the flow of hydraulic fluid through conveyor drive motor 50 and thereby adjust the speed of conveyor belt drive shaft 147. As described in connection with FIG. 7, a hydraulic tensioning pump 45 is mounted upon and driven by the shaft 120 of the tensioning pulley 118 of the conveyor system. Referring to FIG. 19 it is seen that pump 45 has an inlet connection to the hydraulic reservoir R through a filter F2. The output of pump 45 is connected to an adjustable pressure relief valve V11 that is returned to the reservoir through a filter F3.

When the conveyor system first starts in operation, with drive motor 50 turning conveyor drive shaft 147, the resulting tension in the upper run 116 of belt 112 tends to rotate tensioning pulley 118 and its shaft 120. Initially, however, shaft 120 cannot rotate to any appreciable extent because tensioning pump 45 has its outlet blocked by valve V11. This condition is maintained until sufficient tension is built up in the upper run of the conveyer belt to overcome the resistance effectively afforded by relief valve V11 and to permit an appreciable output from tensioning pump 45. Thus, conveyor belt 112 actually begins movement, apart from preliminary tensioning, only when a predetermined tension has been established in the belt. Furthermore, that tension remains constant, at the level required to maintain pump 45 in operation, as long as tunnel 30 functions. The level of the constant tension maintained on the upper run of conveyor belt 112 is established by adjustment of valve V11.

With the conveyor running, the operator next closes a switch PB8, FIG. 18 line 19. This establishes an energizing circuit for the contactor coils for all of the fan motors FM, collectively represented by a coil FMC in FIG. 18 line 19. One of the fan motor contactors includes an auxiliary set of contacts FMC1 that close to afford a holding circuit in parallel with switch PB8. In addition, the power contacts FMC for the fan motors, FIG. 18 lines 1-3, are all closed and the fans are established in operation. As noted above, the illustration of the fan motors and fan motor contactors is greatly simplified in FIG. 18; the fan motors may be arranged to start in sequence to avoid an overload on the power system.

Tunnel 30 is now fully operational, as far as the electrical control system of FIG. 18 is concerned, except for the pan heaters H, line 5. The pan heaters are energized by turning a rotary selector switch SS2 (line 23) to its "ON" position, closing the switch and completing an operating circuit to a percentage timer coil PT through the limit switch 6LS1 and the relay contacts 4CR1, both of which have been closed as described. The percentage timer PT is a simple duty-cycle timing device having a set of contacts 1PT in series with a contactor coil 1H (line 25). The timer closes its contacts 1PT for a given percentage of time in the operational interval for the timer; the timer interval may be about one minute. Whenevr coil 1H is energized, the 1H contacts (line 3) in the power circuit for the pan heaters H are closed to energize the pan heaters.

For maximum efficiency and output, it is desirable to maintain tunnel 30 closed and cold for a substantial period of time, usually a week, even when it is not freezing food product. The tunnel is shut down completely and opened for cleaning or other service operations only at the end of the week or after some like extended period. With the electrical control illustrated in FIG. 18, this is accomplished in part through use of a standby circuit controlled by a rotary selector switch SS1, lines 9 and 12. Hydraulic standby equipment is shown at SB in FIG. 19. Included are shutoff valves V14 and V15 and an accumulator A. When switch SS1 (FIG. 18) is turned to its standby position, the main operating circuit for the pump motor contactor coil 1M is opened, but an auxiliary circuit is established through the secondary contacts of standby switch SS1 (line 12) and a pressure sensing switch 2PS. Switch 2PS senses the pressure in the accumulator A, which is connected to the hydraulic pump P as shown in FIG. 19. Whenever the pressure in the accumulator falls below a predetermined value, selected as a pressure sufficient to maintain the tunnel fully closed and sealed, switch 2PS closes to re-establish an operating circuit for the pump motor contactor 1M so that the main hydraulic pump P is again operated to build up the pressure in accumulator A.

During standby, of course, the entrance and exit doors of the tunnel are closed. Further, there is no necessity for operation of the conveyor, the fans, or pan heaters H. Thus, at the end of a work shift, when going on standby, the operator actuates a conveyor stop switch PB5 (FIG. 18 line 17) to de-energize the conveyor and also actuates a fan stop switch PB7 to shut off the fans. In addition, the operator returns switch SS2 to its off position so that pan heaters H are de-energized. When a resumption of operation is desired, the conveyor, the fans, and the pan heaters can again be placed in operation by actuating switches PB6, PB8 and SS2 as described above.

When it is necessary or desirable to again open up tunnel 30 for cleaning or for any major service operation, the operator first actuates the switches PB5, PB7 and SS2 to shut down the conveyor, the tunnel fans, and the pan heaters. To initiate the tunnel-opening operation, the operator then closes a two-section switch PB4 (FIG. 18 lines 29,31). Closing of switch section PB4-1 actuates horn HO, through limit switch 2LS, signalling lowering of the tunnel base. Closing of switch section PB4-2 establishes an operating circuit for a tunnel-down control relay coil 1CR (line 31). This actuates all of the contacts 1CR1 through 1CR8, in lines 37, 38, 41, 42, 44 45, 48 and 51 of FIG. 18, opening the normally closed contacts and closing the normally open contacts of this relay.

The opening of contacts 1CR7 (line 48) de-energizes solenoid SOL G. The closing of contacts 1CR8 (line 51) establishes an energizing circuit for a solenoid SOL H; this actuates directional valve V7 (FIG. 19) to supply high pressure fluid from pump P to the upper end of each of the cylinders 217-1 through 217-12. Actuation of directional valve V7 also opens a part of a return line for each elevator cylinder, but some of these return lines are not complete at this time. Thus, because solenoids SOL A, SOL B, SOL C and SOL D are all de-energized, there are no return circuits for the elevator cylinders associated with base units 54C and 54N. However, the closing of contacts 1CR6 (FIG. 18 line 45) immediately establishes an operating circuit for solenoids SOL E and SOL F, actuating valves V5 and V6 (FIG. 19) so that the exit base section 54X begins to move outwardly and downwardly toward its lowered position.

When the exit base secton 54X reaches its fully lowered position, two limit switches 13LS1 and 13LS2, which were opened when this base unit was raised, are closed. Switch 13LS1 completes an electrical circuit to each of solenoids SOL A and SOL B through contacts 1CR2 (FIG. 18 line 38), which are now closed. Accordingly, the hydraulic control valves V1 and V2 (FIG. 19) are actuated to establish return paths for the fluid from the elevator cylinders 217-1 through 217-4 for the entrance base unit 54N and this base unit starts its downward movement. When the entrance base unit 54N is fully lowered, two limit switches 1LS and 3LS2 (FIG. 18 line 42), which opened when the entrance base unit was raised, are closed. Two related limit switches 3LS2 and 13LS2 have also been closed, by the lowering of the exit base unit 54X, so that a complete energizing circuit is now established for solenoids SOL C and SOL D. Accordingly, as seen in FIG. 19, the hydraulic control valves V3 and V4 for the elevator cylinders 217-5 through 217-8 for the center section 54C of the tunnel are actuated to provide return paths for the hydraulic fluid. The center base unit 54C begins its downward movement. In addition, limit switch 6LS1 opens, shutting down the conveyor, the fan motors, and the pan heaters if those units of the tunnel have been left in operation.

As the center base unit 54C reaches its fully lowered open position, a limit switch 2LS (FIG. 18 line 29) opens. This shuts off horn HO, signalling to the operator that the tunnel-opening operation has been completed and the operator can release switch PB4. At this point, limit switches 5LS and 15LS (line 33) are both open, de-energizing control relay coil 3CR. This returns contacts 3CR1 through 3CR4 to their original open condition as shown in FIG. 18. To complete shutdown, the operator can then actuate stop switch PB2 to de-energize the hydraulic motor M of the pump.

Liquid Nitrogen Flow Control

Two conditions must be met to properly freeze food products to a predetermined standard. First, the freezing chamber temperature must be held within a certain range. Second, liquid nitrogen flow must be taking place when the products pass beneath the spray header. Merely subjecting the food products to cold gases will not do the freezing job properly. During normal continuous operation of the tunnel, thermal sensors connected to a thermal regulator are adequate to adjust the liquid nitrogen flow such that proper tunnel temperatures are maintained. However, thermal sensors suitable for use at the extremely low temperatures present in a freezing tunnel generally exhibit substantial inertia in operation. They can take on the order of four to eight minutes to react to changes in the thermal load on the tunnel.

Tunnel 30 includes a cryogen flow control 250, FIG. 20, and related electrical control 270, FIG. 21, that affords precise and efficient control for both start-up and shutdown operations, minimizing or eliminating any waste of the cryogen supplied to the tunnel while assuring effective and proper freezing of the food products. This is accomplished through the use of separate start-up and shutdown controls that override the normal thermal regulator for an interval long enough to allow the thermal sensors to respond to changes in tunnel conditions. Control 250, apart from the portion that controls damper 204, is described and claimed in the copending application of Glenn A. Sandberg, Ser. No. 847,718 filed Nov. 2, 1977.

The startup sequence for tunnel 30 is initiated by closing a start switch PB13 (FIG. 21) that is a part of an external food product source control 254, energizing a control relay coil CRX. With coil CRX energized, a set of contacts CRX1 close to establish a holding circuit and another set of relay contacts CRX2 close to complete an operating circuit for a control relay coil 6CR that is a part of the electrical control 270. A pair of relay contacts 6CR1 then close to energize a startup sequence control relay coil 7CR and another pair of contacts 6CR2 open to prevent energization of another control relay coil 10CR.

With relay coil 7CR energized, its contacts 7CR1 close to establish a holding circuit through a pair of normally closed contacts 1CTR1 in a pulse counter 1CTR. A second set of contacts 7CR2 close to actuate counter 1CTR and start the measurement of a first startup interval by counting pulses from a pulse generator 272. A third set of contacts 7CR3 also close, but produce no change in the operation of the circuit.

Counter 1CTR measures a first startup interval by counting pulses from generator 272; when it counts out, its internal contacts 1CTR1 open. This opens the hold circuit contacts 7CR1 but coil 7CR remains energized through the contacts 6CR1 if the external food product source remains in operation. When counter 1CTR counts out, its internal contacts 1CTR2 close to energize a control relay coil 8CR.

With coil 8CR energized, a set of contacts 8CR1 close to establish a holding circuit and another set of contacts 8CR2 open to prevent energization of a relay coil 9CR. A pair of contacts 8CR4 close, but this produces no change in circuit operation. In addition, a set of relay contacts 8CR3 close to energize the operating coil of a timer 1TD and a solenoid SOL M. Thus, when counter 1CTR has counted out, signalling completion of the first startup interval, SOL M is energized to open a valve V31 (FIG. 20). This initiates a supply of nitrogen gas, under pressure, from a $LN_2$ supply 256 through a circuit comprising, in series, the valves V37, PCV1, PCV10, V31, V33 and V32 to the pneumatic control apparatus of the main $LN_2$ flow control valve V21. Valve V21 opens partially to establish a limited flow of cryogen through conduit 33, the $LN_2$ line including a manual shutoff valve V36 and a venturi FE1 and valve V21 to spray header 156. Further, timer 1TD (FIG. 21) begins the measurement of a second startup interval.

When timer 1TD times out, its contacts 1TD1 (FIG. 21) open to de-energize solenoid SOL M. This shuts off the flow of gas to the control element of valve V21 through valve V31 (FIG. 20). With regulator 252 thus driven to its cutoff condition, at the end of the second startup interval, continuing control of the flow of cryogen to header 156 is assumed by a thermal regulator 251. Regulator 251 is of conventional construction; it adjusts the $LN_2$ flow rate in accordance with changes in thermal conditions sensed by a sensor bulb TS by adjustment of the pressure of nitrogen gas applied to the pneumatic control apparatus of the main flow control valve V21 in a circuit comprising valves V37, PCV1, V29, V28, V34 and V32. Valve V29 is subject to throttling control by a conventional temperature controller T1C.

At the beginning of a shutdown sequence, in most instances, operating conditions will be as described above for the termination of the startup sequence, with control relay coils 6CR, 7CR, and 8CR (FIG. 21) all energized. In addition, the operating coil 1TD for the second startup interval timer will remain energized but the timer will have timed out with its contacts 1TD1 open and solenoid SOL M de-energized.

The system operator begins a shutdown sequence by actuation of a stop switch PB14 that is a part of the external food product source control 254. This de-energizes control relay coil CRX; contacts CRX1 open so that coil CRX is not energized again when switch PB14 is released by the operator. Contacts CRX2 also open, de-energizing coil 6CR. As a consequence, contacts 6CR1 open to de-energize coil 7CR (the holding circuit for coil 7CR is already open at counter contacts 1CTR1). In addition, contacts 6CR2 return to their normal closed condition; because relay 8CR remains energized, an operating circuit is established for a shutdown sequence control relay coil 10CR.

With coil 7CR now de-energized, contacts 7CR1 open to prepare the circuit for a subsequent startup operation. Furthermore, contacts 7CR2 open to preclude any additional counting by counter 1CTR and to re-set that counter. Contacts 7CR3 open but this makes no difference to circuit operation because the parallel contacts 8CR4 are closed.

With coil 10CR energized as noted above, a set of relay contacts 10CR1 close, actuating a counter 2CTR to begin counting pulses from pulse generator 272 and thus begin measurement of the first shutdown interval for the system. Another set of contacts 10CR2 also close, establishing a holding circuit for coil 10CR through a pair of normally closed internal contacts 2CTR1 of counter 2CTR.

Counter 2CTR is set to measure a pulse count indicative of clearance of the last food products, following shutdown of the food product source, past the spray header in the freezing tunnel. When counter 2CTR completes this count, its contacts 2CTR1 open, interrupting the holding circuit for relay coil 10CR. However, coil 10CR remains energized through contacts 8CR4 and 6CR2. In addition, the counter contacts 2CTR2 close to energize a control relay coil 9CR.

With coil 9CR energized, the contacts 9CR1 of this relay open to interrupt the holding circuit for coil 8CR. Since counter 1CTR has reset, coil 8CR is de-energized and its contacts 8CR1, 8CR3 and 8CR4 all open. The opening of contacts 8CR3 opens the operaing circuit for timer 1TD and allows that timer to reset. The opening of contacts 8CR4 drops out relay 10CR. In addition, the contacts 8CR2 return to their normally closed condition to complete a holding circuit for relay coil 9CR through its own contacts 9CR2, which are now closed.

With coil 9CR energized, a set of relay contacts 9CR3 close to energize the operating coil for a timer 2TD and start that timer measuring a second shutdown interval for the tunnel control. In addition, closing of the contacts 9CR3 establishes an energizing circuit for the solenoid SOL N, which actuates valve V32 to shut off all flow of gas to the control element of valve V21 and thus cut off all flow of liquified nitrogen to the spray header 156 of the tunnel (FIG. 20). Accordingly, it is seen that when counter 2CTR has completed its measurement of the first shutdown interval, and actuates control relay 9CR to energize solenoid SOL N, the valve V32 that is common to both the thermal flow regulator 251 and the auxiliary flow regulator 252 is actuates to cutoff condition to stop all flow of cryogen to the tunnel.

When timer 2TD times out, signalling completion of a second shutdown interval, its contacts 2TD1 open to de-energize solenoid SOL N. This opens valve V32 (FIG. 20) and restores the system to its normal thermal control. In addition, a pair of contacts 2TD2 in the holding circuit for control 8CR open to assure de-energization of that relay.

Damper Control

A pressure switch 1PS in the pneumatic control line of control 251, FIG. 20, senses the pneumatic pressure of nitrogen gas being fed to flow control valve V21. When sufficient pressure is applied to the valve V21 to initiate a given rate of $LN_2$ flow, switch 1PS closes, thereby energizing SOL L (line 54, FIG. 18). SOL L shifts a damper control valve V38 (FIG. 20) to a mode which supplies pneumatic pressure to damper cylinder 206 to open the tunnel gas damper 204. Damper 204 remains open until pressure switch 1PS opens to de-energize SOL L. Thus, damper 204 is automatically held open whenever the flow of cryogen into tunnel 30 exceeds a given level but is closed whenever the cryogen flow is below that level or is shut off. Appropriate adjustment (not shown) for the open position of damper 204 is preferably provided.

Tunnel 30, as described and illustrated, is of linear configuration, presently the most common tunnel design. However, the tunnel may be constructed in a U-shaped configuration or even in a spiral configuration to converse floor space and afford a more compact overall arrangement. Further, it will be recognized that the tunnel can be constructed with just two base modules, omitting the center module, or with two or even more center modules, depending on the length desired for the tunnel.

We claim:

1. In a cryogenic food product freezing tunnel of the kind comprising an elongated tunnel housing conveyor means extending through the housing to transport food product from an entrance end to an exit end, cryogen input means to introduce a cryogen into the tunnel at a cryogen input location near the exit end, and exhaust means to exhaust cryogen gas from an exhaust location near the entrance end, the tunnel including a stationary structure comprising the cover of the tunnel housing, the conveyor means, the cryogen input means, and the exhaust means, the base of the tunnel housing being of generally U-shaped cross sectional configuration and being suspended from the stationary structure for movement between an elevated operational position sealed against the housing cover and a lowered, open service position, the improved construction comprising:

the housing base including a plurality of modular base units aligned end-to-end and comprising at least one center base unit interposed between two end base units;

individual base unit elevator means, for raising and lowering each modular base unit separately from the others;

guide means for each end base unit, for guiding that end base unit along a path extending both downwardly and longitudinally outwardly of the center of the tunnel through a small horizontal displacement at the beginning of its downward movement toward its service position, and for guiding that end base unit back along the same path at the end of its upward movement to its operational position;

and elevator control and actuation means for actuating the elevator means to raise and lower the end base units in a predetermined sequence such that the end base units are lowered to service position before the center base unit and the center base unit is raised to operational position before the end base units.

2. A cryogenic food product freezing tunnel according to claim 1, in which the guide means for each end base unit comprises a cam follower connected to the end base unit for movement therewith and engaging a cam track mounted on the stationary structure of the tunnel housing, the cam track having an upper cam portion inclined at an acute descent angle D to the horizontal, and in which each end base unit has side walls joining the side walls of a stationary housing end section along an interface inclined at an acute interface angle I to the horizontal, descent angle D being larger than interface angle I to preclude subjecting the interface to shearing forces during raising or lowering of the end base units.

3. A cryogenic food product freezing tunnel according to claim 1, in which each end base unit has side walls joining the side walls of a stationary housing end section along an interface inclined at an acute interface angle I to the horizontal, in which the elevator means each comprise a fluid pressure operated cylinder, and in which the elevator control and actuation means includes seal maintenance means for maintaining a fluid supply of predetermined minimum pressure to all of the elevator means when the base units are in their raised operating position, thereby maintaining the tunnel sealed both longitudinally and vertically, without mechanical latches, regardless of thermal contraction of the tunnel housing.

4. A cryogenic food product freezing tunnel, according to claim 3, in which the seal maintenance means comprises a pressure accumulator connected to the elevator cylinders and to a fluid pressure supply pump, and a pressure sensor connected to the accumulator and to the pump to actuate the pump whenever the accumulator pressure falls below the predetermined minimum pressure, the pump further comprising a fluid pressure supply for a drive system for the tunnel conveyor.

5. A cryogenic food product freezing tunnel according to claim 1, and further comprising:

each base unit including a series of sub-modular base sections joined end-to-end, each base section being of U-shaped cross-sectional configuration and having walls of insulation material surfaced with an internal sheet metal layer and an external sheet metal layer;

each internal sheet metal layer projecting beyond the insulation at the ends of the base section for a given distance;

each external sheet metal layer projecting beyond the insulation at the ends of the base section for a given distance less than the projection of the internal sheet metal layer;

the internal sheet metal layers of each pair of abutting sub-modular base sections being welded together to afford a continuous internal metal surface layer at the juncture of the two sub-modular base sections, leaving the external metal surface layers separated by an expansion-contraction gap;

and a slip joint shield covering the gap between the external sheet metal layers of the abutting sub-modular base sections but allowing free relative movement therebetween to compensate for differential thermal contraction and expansion of the internal and external surfaces of the base units.

6. A cryogenic food product freezing tunnel according to claim 1 in which:

the cover of the tunnel housing is formed by a series of modular cover units joined end-to-end, each modular cover unit comprising a thick wall of insulation material with an external sheet metal cover; and each modular cover unit includes at least one thermal expansion-contraction joint, each such joint comprising an internal recess of inverted V-shaped configuration extending transversely of that cover unit.

7. A cryogenic food product freezing tunnel according to claim 1 in which:

The cover of the tunnel housing is formed by a series of modular cover units joined end-to-end, each modular cover unit comprising a thick wall of insulation material with an external sheet metal cover;

each modular cover unit is sealed to an adjacent cover unit by a resilient gasket including a relatively wide top portion, a narrower intermediate shank portion, and a bifurcated lower portion affording two spaced legs, the overall width of the lower portion of the gasket being at least as large as the top portion width when the gasket is unstressed, contraction of the inner surface of the housing cover being accommodated by movement of the gasket legs away from each other.

8. A cryogenic food product freezing tunnel comprising:

a stationary structure including an entrance end housing section joined to one end of an elongated tunnel housing cover and an exit end housing section joined to the other end of the housing cover;

an elongated U-shaped tunnel housing base located below the housing cover between the entrance and exit housing sections;

a plurality of elevator devices, each comprising a hydraulic cylinder, for moving the housing base between a raised operational position sealed against the housing cover and an open lowered service position;

the ends of the side walls of the housing base being inclined outwardly and downwardly complemental to inclined side walls on the housing end sections;

and elevator actuation and control means for actuating the elevator devices to maintain a constant upward pressure on the housing base, throughout its length, whenever the housing base is in its raised operational position, and thereby maintain the housing base sealed against the housing cover and against both housing end sections regardless of changes in thermal conditions for the tunnel, the elevator control means comprising a pressure accumulator connected to the elevator cylinders and to a fluid pressure supply pump, and a pressure sensor connected to the accumulator and to the pump to actuate the pump whenever the accumulator pressure falls below the predetermined minimum pressure.

9. A cryogenic food product freezing tunnel according to claim 8, in which the interface surfaces between the housing base and the housing cover are sealed by double-bulb sealing gaskets, each gasket comprising a body of low-temperature silicone material affording two hollow spaced tubular protrusions extending longitudinally of the gasket, and the gasket body being covered with a surface layer of polyfluoroethylene resin bonded to the gasket body.

10. A cryogenic food product freezing tunnel according to claim 9 in which the interface surfaces between the housing base and the end housing sections are sealed by double-bulb silicone sealing gaskets having bonded covers of polyfluoroethylene resin.

11. A cryogenic food product freezing tunnel according to claim 8, in which the housing base comprises a plurality of U-shaped modular base units aligned end-to-end, and in which the interface surfaces between adjacent modular base units are sealed by double-bulb sealing gaskets, each gasket comprising a body of low-temperature silicone material affording two hollow spaced tubular protrusions extending longitudinally of the gasket, and the gasket body being covered with a surface layer of polyfluoroethylene resin bonded to the gasket body.

12. In a cryogenic food product freezing tunnel of the kind comprising an elongated tunnel housing, conveyor means comprising an endless conveyor belt having an upper run and a lower run extending through the housing to transport food product from an entrance end to an exit end on the upper run of the belt, cryogen input means to introduce a cryogen into the tunnel at a cryogen input location near the exit end, and exhaust means to exhaust cryogen gas from an exhaust location near the entrance end, the tunnel including a stationary structure comprising the cover of the tunnel housing, the conveyor means, the cryogen input means, and the exhaust means, the base of the tunnel housing being of generally U-shaped cross sectional configuration and being suspended from the stationary structure for movement between an elevated operational position sealed against the housing cover and a lowered, open service position, the improved construction comprising:

the housing base and the housing cover each including a plurality of modular units aligned end-to-end;

an array of modular conveyor belt support units mounted on the stationary structure along the opposite sides of the tunnel in end-to-end alignment and extending for substantially the entire length of the tunnel;

each belt edge support unit comprising an elongated upper belt support rail engaging and supporting the bottom of a length of the upper belt run and a lower belt support rail engaging and supporting the bottom of a corresponding length of the lower belt run;

the overall length of each belt support unit being only a fraction of the length of the modular housing units, and each modular housing unit including a plurality of belt support units separated by short thermal expansion-contraction gaps;

and the ends of both support rails in each belt support unit being inclined downwardly at a slight angle to preclude snagging the belt.

13. A cryogenic food product freezing tunnel according to claim 12 in which each belt support rail is a stainless steel rail having a cover of a layer of high density polyethylene.

14. A cryogenic food product freezing tunnel according to claim 12, and further comprising:

an elongated liquid cryogen collection pan, located immediately below the cryogen input location between the upper and lower runs of the conveyor belt and extending for long distances longitudinally of the conveyor belt in both directions from the cryogen input location;

the upper belt support rails directing the upper run of the conveyor belt through the pan along a path comprising a long, very gradually inclined entrance segment, a long horizontal central segment, and a long, very gradual inclined exit segment, the lower surface only of the upper run of the conveyor belt contacting liquid cryogen in the pan to cause the liquid cryogen to boil and spatter against the undersurface of food products on the conveyor belt as those foods products traverse the central segment of the path through the pan.

* * * * *